(No Model.)

A. SCHAPIRO.
NUT LOCK.

No. 374,274.  Patented Dec. 6, 1887.

Witnesses:
C. F. Scheler
M. Kapf

Inventor:
Arick Schapiro
by R. ...
his attorney

UNITED STATES PATENT OFFICE.

AISIK SCHAPIRO, OF BERLIN, GERMANY.

NUT-LOCK.

SPECIFICATION forming part of Letters Patent No. 374,274, dated December 6, 1887.

Application filed September 28, 1885. Serial No. 178,397. (No model.) Patented in England September 14, 1885, No. 10,873; in France September 14, 1885, No. 171,158; in Belgium September 14, 1885, No. 70,196; in Sweden September 14, 1885, No. 268; in Austria-Hungary September 14, 1885, No. 44,670 and No. 15,604; in Italy September 14, 1885, No. 18,851, and in Germany October 21, 1885, No. 36,522.

*To all whom it may concern:*

Be it known that I, AISIK SCHAPIRO, a subject of the Emperor of Germany, and a resident of Berlin, in the Empire of Germany, have invented a new and useful Improvement in Lock-Nuts for Screw-Bolts, (for which I have obtained Letters Patent in the following countries: Germany, October 21, 1885, No. 36,522; England, September 14, 1885, No. 10,873; France, September 14, 1885, No. 171,158; Belgium, September 14, 1885, No. 70,196; Sweden, September 14, 1885, No. 268; Austria-Hungary, September 14, 1885, Nos. 44,670 and 15,604; Italy, September 14, 1885, No. 18,851;) and I hereby declare the following to be a full and clear description thereof.

The object of this invention is to provide a cheap, simple, and efficient lock for the nuts for screw-bolts, so that the nut may be locked in any position to which it may be screwed home, and the locking may be quickly done and undone when required.

The nature of this invention consists in forming a locking-indentation in the end of the bolt and attaching to the nut a flexible metallic locking-plate, which may be forced or driven into said locking-notch of the bolt at any point of the rotation of the nut, thereby securely locking the nut in any position it may chance to assume when it is screwed home.

The invention will be readily understood by reference to the accompanying drawings, of which—

Figure 1:
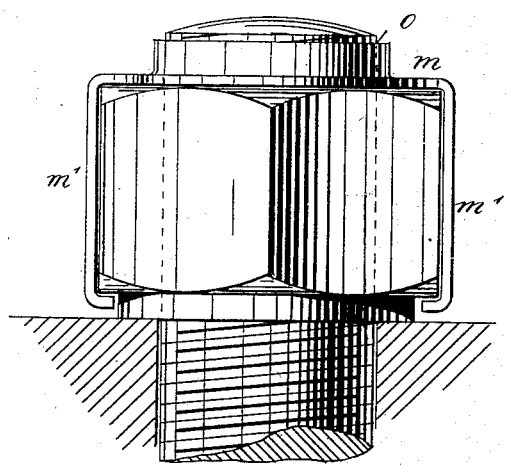
Figure 3:
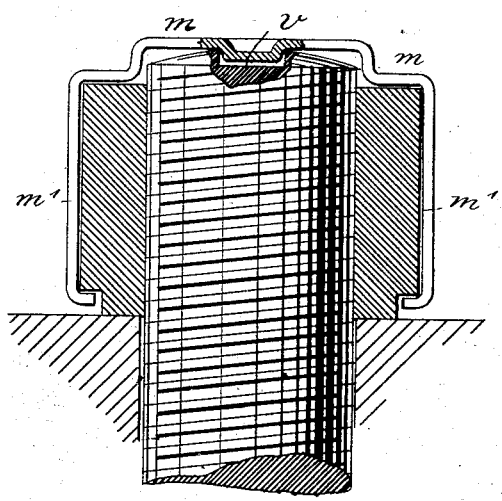
Figure 2:
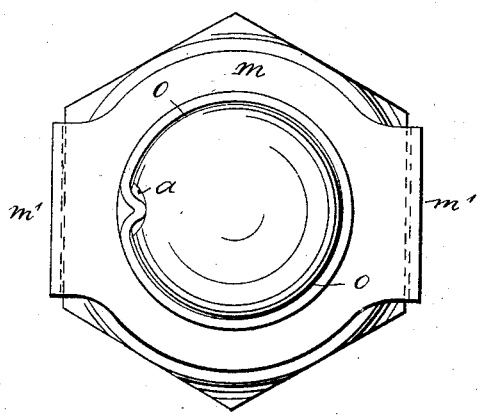
Figure 4:
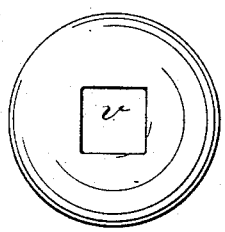

Figure 1 is an elevation of a bolt the nut of which is provided with my improved locking device. Fig. 2 is a plan of Fig. 1. Fig. 3 shows an elevation of a modification of my nut-lock, partly in section. Fig. 4 is a plan of the bolt of Fig. 3.

The locking device consists of a locking-notch formed in the bolt in the rim of its end or in the center of the same, and attaching to the nut a flexible metallic plate, which, while it is securely held to the side of the nut by its side arms, $m'$, which embrace the sides of the nut, so as to prevent the rotation of the nut within it, is capable of being bent into the locking-notch of the bolt at any point of the rotation of the nut on the bolt.

It is evident that the locking-notches of the bolt may be constructed in two forms, each the full equivalent of the other. Thus in Figs. 1 and 2 is shown a bolt with a re-entering notch, $a$, in its side, adapted to receive an inbent portion of the upwardly-projecting flange which circumscribes the central aperture, $o$, of the locking-plate $m$. In Figs. 3 and 4 is shown a bolt with a rectangular recess formed in its end, into which said recess an indentation or inwardly-projecting lug may be pressed or driven from its metallic locking-plate $m$. In either of these two forms the construction is substantially the same—a thin flexible locking-plate attached to the nut so that the nut cannot rotate within or independently of it, and a bolt provided with a notch into which the flexible locking-plate may easily be driven or pressed, so as to securely lock the nut on the bolt at any location at which the nut may chance to be when it is screwed home. These locking-plates are cheaply constructed and applied, and can easily be bent outwardly or unlocked when it is desired to unscrew the nut.

Having thus described my invention, what I claim as new, and desire to secure by Letters Patent, is—

As a nut-locking device, a thin flexible metallic plate adapted to fit over the exterior face of the nut and bolt, with parts of the thin locking-plate bent down against the sides of the nut and in close contact therewith, and part of the locking-plate forced, driven, or pressed into a recess in the bolt adapted to receive such indentation or locking-clamp, substantially as described.

In witness whereof I have hereunto set my hand in presence of two witnesses.

AISIK SCHAPIRO.

Witnesses:
H. POHLMANN,
B. ROI.